US007174044B2

(12) United States Patent
Ding et al.

(10) Patent No.: US 7,174,044 B2
(45) Date of Patent: Feb. 6, 2007

(54) METHOD FOR CHARACTER RECOGNITION BASED ON GABOR FILTERS

(75) Inventors: Xiaoqing Ding, Beijing (CN); Xuewen Wang, Beijing (CN); Changsong Liu, Beijing (CN); Liangrui Peng, Beijing (CN); Chi Fang, Beijing (CN)

(73) Assignee: Tsinghua University, Beijing (CN)

( * ) Notice: Subject to any disclaimer, the term of this patent is extended or adjusted under 35 U.S.C. 154(b) by 692 days.

(21) Appl. No.: 10/444,315

(22) Filed: May 23, 2003

(65) Prior Publication Data
US 2004/0017944 A1   Jan. 29, 2004

(30) Foreign Application Priority Data
May 24, 2002   (CN)   ................. 02 1 17865

(51) Int. Cl.
*G06K 9/76* (2006.01)
(52) U.S. Cl. .................................... 382/210
(58) Field of Classification Search ................. 382/185
See application file for complete search history.

(56) References Cited

U.S. PATENT DOCUMENTS 5,164,992 A * 11/1992 Turk et al. .................. 382/118

OTHER PUBLICATIONS

Hamamoto, "Recogntion of Handwritten Numerals using Gabor Features," 1996, IEEE.*
Kuo, "A Radical-Partitioned Neural Network System Using a Modified Sigmoid Function and a Weight-Dotted Radical Selector for Large-Volume Chinese Characters Recognition VLSI," 1994, IEEE.*
Wang, "Optimized Gabor Filter Based Feature Extraction for Character Recognition," 2002, IEEE.*
Hamamoto, "Recognition of Handprinted Chinese Characters using Gabor Features," 1995, IEEE.*

* cited by examiner

*Primary Examiner*—Joseph Mancuso
*Assistant Examiner*—Alex Liew
(74) *Attorney, Agent, or Firm*—RatnerPrestia

(57) ABSTRACT

In a method for character recognition based on Gabor filter group the Gabor filter's joint spatial/spatial-frequency localization and capability to efficiently extract characters' local structural features are employed to extract, from the character image, information of the stroke direction of characters as the recognition information of characters, so as to improve the capability to resist the noises, backgrounds, brightness variances in images and the deformation of characters. Using this information, a simple and effective parameter design method is put forward to optimally design the Gabor filter, ensuring a preferable recognition performance; a corrected Sigmoid function is used to non-linearly adaptively process the stroke direction information output from the Gabor filter group. When extracting the feature from blocks, Gaussian filter array is used to process the positive and negative values output from Gabor filter group to enhance the discrimination ability of the extracted features.

10 Claims, 10 Drawing Sheets

|  |  | Method of the present invention | DH |
|---|---|---|---|
| Song fong | 75-100dpi | 99.28 | 97.71 |
|  | 150-200dpi | 99.87 | 99.59 |
|  | 250-300dpi | 99.82 | 99.82 |
| Kai fong | 75-100dpi | 96.70 | 89.47 |
|  | 250-300dpi | 99.40 | 99.75 |
| Li fong | 75-100dpi | 74.41 | 47.45 |
|  | 150-200dpi | 95.60 | 86.55 |
|  | 250-300dpi | 98.18 | 95.74 |

FIG 13

| Noise parameter $\sigma$ | Original image | Gaussian noise (average=0) | | | |
|---|---|---|---|---|---|
|  |  | 2.5 | 12.5 | 25 | 38.5 |
| Method of the present invention | 99.44 | 98.92 | 98.38 | 96.56 | 92.53 |
| DH | 99.55 | 92.05 | 72.90 | 30.85 | 8.28 |

FIG 14

|  | First digit | First ten digit |
|---|---|---|
| Method of the present invention | 98.50 | 99.85 |
| DH | 98.39 | 99.79 |

FIG 15

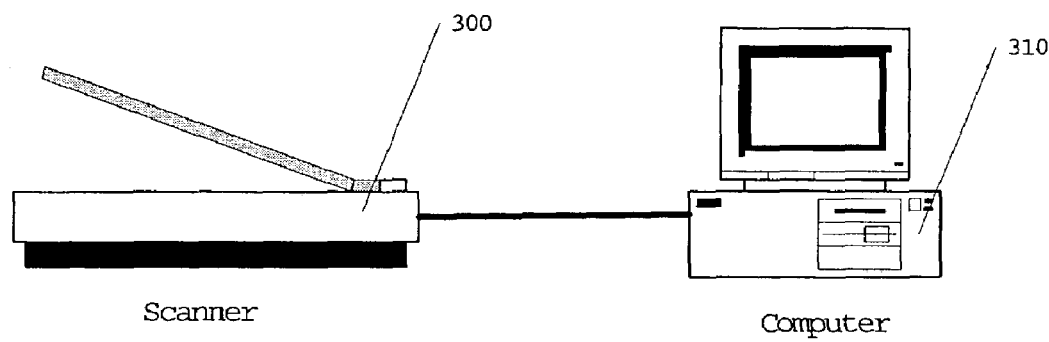
FIG 16
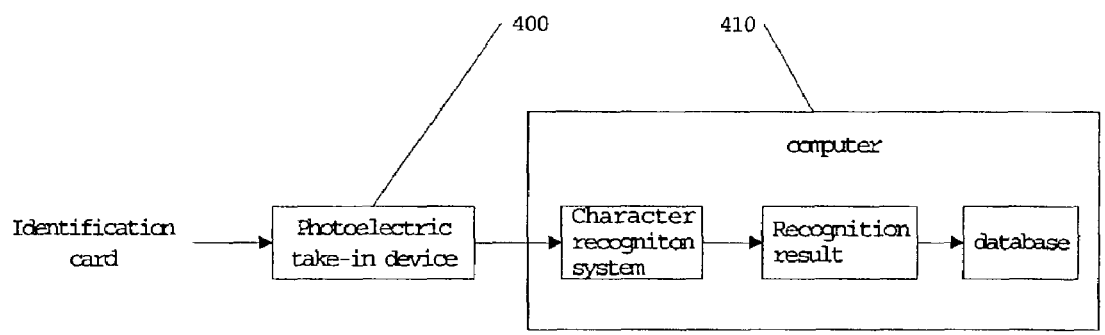
FIG 17
|  | Identification card | Chinese characters | numbers |
|---|---|---|---|
| Total number | 41 | 104 | 633 |
| Number of recognition faults | 3 | 3 | 0 |
FIG 18

METHOD FOR CHARACTER RECOGNITION BASED ON GABOR FILTERS

FIELD OF THE INVENTION

The present invention relates to a method for character recognition. More particularly, the present invention relates to a method for character recognition based on Gabor filters.

BACKGROUND OF THE INVENTION

Traditional methods for character recognition carry out recognition based on binary character images. When recognizing various low-quality images, for example, the low-resolution image, the image of an identification card, an automobile license plate and a image of natural scenery, because their binarized images are extremely low quality, traditional methods for character recognition present a poor performance in recognizing characters regarding above-mentioned images.

Because of the disadvantages of traditional methods for character recognition, many prior arts does not carry out recognition based on binarization, but directly extract recognition features from a gray character image.

To directly extract recognition features from a gray character image, two specific methods are as follows:

One method extracts topographical and gradient features, etc. by means of analyzing the gradient distribution of a gray character image. Because the distribution of image's brightness needs to meet with some specific rules, the method owns a poor capability to resist noises.

The other method extracts recognition features by means of simple orthogonal transformation, for example, FFT or DCT Because the transformations reflect only global information of a character image, the method cannot extract local stroke direction and structural information of the character image, resulting in a poor capability to resist to the change in image's brightness and the deformation of the character.

Gabor filter possesses excellent joint spatial/spatial-frequency localization and capability to efficiently extract local structural features, thus, the method emerges at present to employ Gabor filters to extract the recognition features of handwritten digital images. However, current methods have following disadvantages:

When designing the Gabor filters, because the method selects different parameter values on the basis of different recognition ratios, the procedure of the method is tedious and the amount of calculation is tremendous, resulting in a poor capability to recognize.

The method does not apply Gabor filter to gray character image of low quality to carry out the recognition procedure, but apply Gabor filter only to binary image to recognize the characters. Therefore, when the method is applied to gray character image of low quality, the capability to discriminate the strokes off backgrounds of character images is poor.

Upon the above, though Gabor filter is used for character recognition, the method does not make full use of Gabor filter's excellent joint spatial/spatial-frequency localization and capability to efficiently extract local structural features.

SUMMARY OF THE INVENTION

One objective of the invention is to provide a method for character recognition based on Gabor filters. With the method, Gabor filter's excellent joint spatial/spatial-frequency localization and capability to efficiently extract characters' local structural features are employed to extract, from the character image, the most important and most stable information—the information of the stroke direction of characters—as the recognition information of characters so as to improve the capability to resist the change in image's brightness and the deformation of characters.

Another objective is to provide a method for character recognition based on Gabor filters. With the method, according to the statistic result of the stroke direction information of character image, a simple and effective parameter design method is put forward to optimally design the Gabor filter, ensuring a preferable recognition performance.

Another objective is to provide a method for character recognition based on Gabor filters. With the method, a corrected Sigmoid function is used to non-linear adaptively process the stroke direction information output from the Gabor filter so that the processed stroke direction information possesses a better restrain on the change in image's brightness, stroke's illegibility and fracture and disturbance from the background, and the robustness of the recognition features is dramatically enhanced.

Another objective is to provide a method for character recognition based on Gabor filter group. With the method, when extracting the histogram feature from blocks, Gaussian filter array is used to process the positive and negative values output from Gabor filter group to enhance the discrimination ability of the extracted features.

In order to realize the objectives of the invention, according to one embodiment of the invention, the method comprises steps:

P1: pre-processing a character image, including receiving, pre-processing the character image to be recognized, and obtaining a binary or gray image with N×N pixels for each character to be recognized, wherein said the binary or gray image for each character to be recognized is represented by a matrix, $[A(i, j)]_{N \times N}$;

P2: processing the matrix $[A(i, j)]_{N \times N}$ for the image of each character to be recognized obtained in the step of pre-processing, including the following steps:

extracting stroke direction information of characters, including employing a Gabor filter group composed of K two-dimension Gabor filters to extract stroke information in K different directions from the matrix $[A(i, j)]_{N \times N}$ for the character image to be recognized, and obtaining K matrixes $[Gm(i, j)]_{M \times M}$ for the character image to be recognized, m=1 ... K, each of said matrixes possessing M×M pixels and representing the stroke information of one direction;

extracting histogram features from blocks, including extracting features from blocks in said K matrixes of the character image to be recognized, i.e., $[Gm(i, j)]_{M \times M}$, m=1 ... K, obtained in the step of extracting stroke direction information of characters, and obtaining a initial recognition feature vector V with a high dimension for the character image to be recognized;

compressing the features, including compressing the initial recognition feature vector V, and obtaining a recognition feature vector $V_c$ with a low dimension for the character image to be recognized;

recognizing characters, including employing a specific classifier to calculate the distance between the recognition feature vector Vc for the image of each character to be recognized and the category center vector of each of the character categories, and selecting a nearest distance from the distances and the character category corresponding to the nearest distance, then calculating the character code for each character to be recognized according to national standard code or ASCII code of the character category.

P3: repeating step P2, until the character code for the image of each character to be recognized is obtained.

BRIEF DESCRIPTION OF THE DRAWINGS

FIG. 13 is a table showing the difference of recognition ratio for recognizing character images with different resolutions between an embodiment of the invention and DH method which extracts directional edge histogram features from the binary character images.

FIG. 14 is a table showing the difference of recognition ratio for recognizing the images added with noises between an embodiment of the invention and DH method.

FIG. 15 is a table showing the difference of recognition ratio for recognizing the samples of offline, handwritten Chinese characters between an embodiment of the invention and DH method.

FIG. 16 is a diagram showing the structure of a typical character recognition system.

FIG. 17 is a diagram showing the structure of identification card recognition system based on the method for character recognition of present invention.

FIG. 18 is a diagram showing the result of identification card recognition in identification card recognition system.

DETAILED DESCRIPTION OF THE DRAWINGS

As stated above, due to Gabor filter's excellent optimum joint spatial/spatial-frequency localization and capability to efficiently extract character's local structural features, and since the main features of a character image is the structure of the character's strokes, the basic ideas of the present invention is to employ Gabor filter to extract the information of strokes in different direction of a character to be recognized so as to form recognition features highly robust to the disturbance of the image and the deformation of the strokes, then employ classifier to get the character label (or code) for the character to be recognized based on obtained recognition features.

Figure 1:
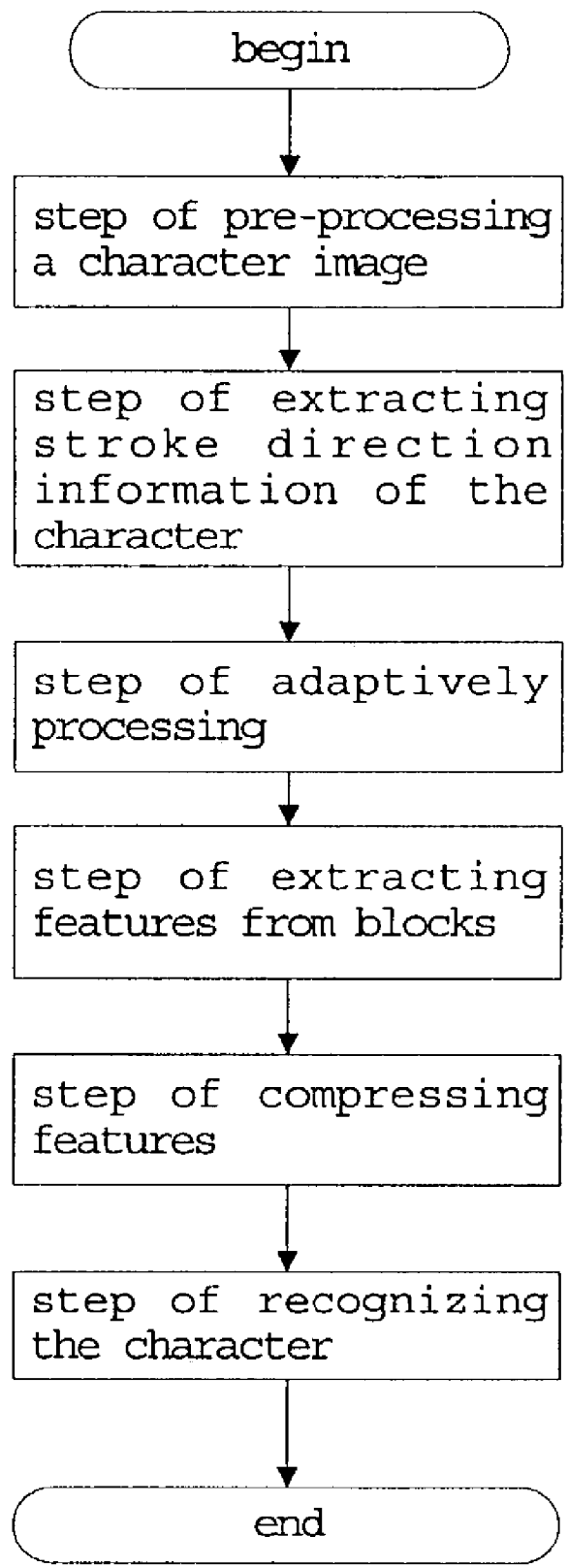
FIG. 1 is a flow chart of a method for character recognition based on Gabor filter group.

As shown in FIG. 1, a method for character recognition based on Gabor filter group of the present invention comprises steps as follows:

pre-processing a character image, wherein receiving, pre-processing the character image to be recognized, thus, obtaining a binary or gray image with N×N pixels for each character to be recognized, said the binary or gray image for each character to be recognized represented by a matrix $[A(i, j)]_{N \times N}$;

extracting stroke direction information of characters, wherein employing a Gabor filter group composed of K two-dimension Gabor filters to extract stroke information in K different directions from the matrix $[A(i, j)]_{N \times N}$ for the image of each character to be recognized, thus, obtaining K matrixes $[G_m(i, j)]_{M \times M}$ for the image of each character to be recognized, m=1 . . . K, each of said matrix possessing M×M pixels and representing the stroke information of one direction;

adaptively processing, wherein employing corrected Sigmoid function to adaptively process the K matrixes $[G_m(i, j)]_{M \times M}$, m=1 . . . K, obtained in the step of extracting stroke direction information of characters, each of said matrixes representing the stroke information of one direction, thereby, obtaining K matrixes $[F_m(i, j)]_{M \times M}$ for the image of each character to be recognized;

extracting features from blocks, wherein extracting features from blocks of said K matrixes of the image of each character to be recognized, i.e., $[F_m(i, j)]_{M \times M}$ obtained in the step of adaptively processing, thus, obtaining a initial recognition feature vector V with a high dimension for the image of each character to be recognized;

compressing the features, wherein compressing the initial recognition feature vector V, thereby, obtaining a recognition feature vector Vc with a low dimension for the image of each character to be recognized;

recognizing characters, wherein employing a specific classifier to calculate the distance between the recognition feature vector Vc for the image of each character to be recognized and the category center vector of each of the character categories, and selecting a nearest distance from the distances and the character category corresponding to the nearest distance, then calculating the character code for each character to be recognized according to national standard code or ASCII code of the character category.

For a more complete understanding of the detailed steps of the method of the present invention, reference is made to the following descriptions taken in conjunction with the accompanying drawings.

I. Step of Pre-Processing the Character Image

The step of pre-processing the character image comprises three steps as follows:

cutting the character image, wherein employing the row/column projection algorithm or character block orientation algorithm to cut the image of each character to be recognized from the whole image;

reversing the brightness of the image, wherein turning the color of each image obtained from cutting step into white and the color of the background into black, i.e., the brightness value of the pixels of the strokes of the image higher than that of the background;

normalizing the size of the image, wherein normalizing the images with different sizes into images with the same size so as to be convenient for the consecutive step of features extracting and achieve a stable capability to recognize the variance in size and the slight deformation of characters during the course of recognition, and generally employing well-known algorithms, i.e., gravity-center to shape-center normalization algorithm or line density equalization algorithm, to normalize the size of images.

After the step of pre-processing, each of obtained images are all gray or binary images with the unified size, and characters in white and the background in black, i.e., the brightness value of the pixels of the strokes of the image higher than that of the background. Assuming the size of the gray or binary image for each of character to be recognized is N×N pixels, the image can be represented by a matrix $[A(i, j)]_{N \times N}$, wherein $A(i, j)$ represents the value of the pixel on $i^{th}$ row and $j^{th}$ column in the image.

Step of extracting the stroke information of a character

Said step mainly includes employing the Gabor filter group to extract the information of the strokes in K different directions from $[A(i, j)]_{N \times N}$ for the image of each character to be recognized, thereby, obtaining K matrixes $[G_m(i, j)]_{M \times M}$, m=1 ... K, each of said matrix possessing M×M pixels and representing the stroke information of one direction.

It is necessary to optimize the parameter of the Gabor filter group before its usage. The objective of optimizing the parameter is to reduce the similarity among output matrixes $\{[G_m(i, j)]_{M \times M}\}$, (1<=m<=K) by means of setting the optimal parameters for the Gabor filter group.

The optimization of Gabor filter group's parameters involves the following points: statistic of the width and direction of strokes in images of characters, realization of Gabor filter group, determination of initial parameters of Gabor filter group and optimization of the parameters of Gabor filter group by means of principle of information entropy.

Now the key points in optimization procedure are illustrated as follows.

Statistic of the width and direction of strokes in images of characters

When determining the initial parameters of Gabor filter group, the average width and direction of strokes of the character image is used. Therefore, it is necessary to obtain the statistic of the average width and direction of strokes in images of characters in advance.

Figure 3:
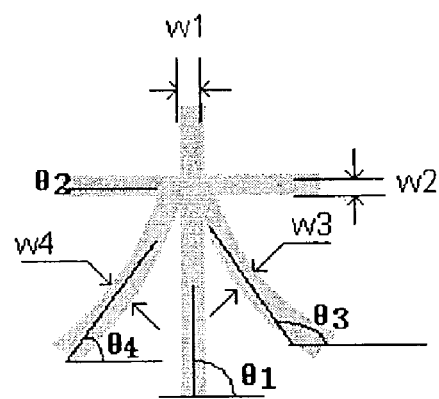
FIG. 3 is a diagram of measuring the width and direction of a character's strokes.

As shown in FIG. 3, for each simple stroke in the image (the complex stroke can be split into several simple strokes, i.e., horizontal stroke, perpendicular stroke, left-falling stroke and right-falling stroke), near the center of the stroke, assuming the width $w_i$ (i=1, 2, 3, ...) perpendicular to the direction of the stroke; estimating the direction of the stroke $\theta_i$ (i=1, 2, 3, ...) based on the horizontal direction. For some strokes, if the left-falling and right-falling strokes are not straight lines, least square estimation is used to obtain an optimal fitting straight line, the included angle between the fitting straight line and the horizontal direction is defined as the direction of the stroke. "W" represents the average width of strokes and $\{\theta_m\}$ (1<=m<=K) represents the typical direction of strokes.

Realization of Gabor filter group

Gabor filter group is generally composed of a plurality of two-dimension Gabor filters, the number of which is dependent on the actual requirement. Usually the impulse response function of two-dimension filter takes the following form:

$$h(x, y; \lambda, \phi, \sigma_x, \sigma_y) = \exp\left\{-\frac{1}{2}\left[\frac{R_1^2}{\sigma_x^2} + \frac{R_2^2}{\sigma_y^2}\right]\right\} \cdot \exp\left[i \cdot \frac{2\pi R_1}{\lambda}\right],$$

wherein $R_1 = x \cdot \cos\phi + y \cdot \sin\phi$,
$R_2 = -x \cdot \sin\phi + y \cdot \cos\phi$ Therefore, the parameters of Gabor filter group composed of K Gabor filters, whose impulse response function is abbreviated as $h_m(x,y)$ are $\{\lambda_m, \phi_m, \sigma_{xm}, \sigma_{ym}, D\}$ (1≤m≤K), wherein D is the extracting spacing in the space of the Gabor filter group.

After pre-processing, the image $[A(i, j)]_{N \times N}$ is processed by a Gabor filter group composed of K Gabor filters, thereby, obtaining K matrixes, each of whom is represented by $\{[G_m(i, j)]_{M \times M}\}$, (1<=m<=K), wherein, M=N/D.

$[G_m(i, j)]_{M \times M}$ can be obtained by following convolution calculation:

$$G_m(i, j) = \sum_{p=-C}^{p=C} \sum_{q=-C}^{q=C} h_m(p, q) \Box A(i \times D - p, j \times D - q),$$

Wherein the space range of the impulse response function $h_m(x,y)$ can be defined as $-C<=x<=C$, $-C<=y<=C$, because $h_m(X,Y)$ is a function which attenuates very quickly, when its absolute value is less than a certain threshold value, for example, $10^{-3}$, $h_m(x,y)$ imposes slight influence on the result and it is unnecessary to take it into consideration during the course of calculation, wherein $C=N/4$.

Determination of the initial parameters of Gabor filter group

According to the statistic result of average width W and typical direction $\theta_m$ of strokes of the image, the parameters $\{\lambda_m, \phi_m, \sigma_{xm}, \sigma_{ym}, D\}$ (1≤m≤K) of the Gabor filter group composed of K Gabor filters are determined as follows:

$\lambda_m = 2W, \phi_m = \theta_m - 90°, \sigma_{xm} = \sigma_{ym} = \sigma, a \leq \sigma \leq b, D \leq \sigma/\sqrt{2},$
$1 \leq m \leq K$ wherein:

$$a = \frac{\lambda}{4\sqrt{2} \cdot \pi \cdot \sin(\pi/(2k))}, \quad b = \sqrt{2} W$$

Wherein, as for $\sigma$, only a range is defined and the specific value will be defined in the procedure of parameter optimization.

Optimizing the parameters of Gabor filter group by means of information entropy principle.

During the procedure of parameter optimization, in order to determine the degree of similarity among $\{[G_m(i, j)]_{M \times M}\}$ ($1<=m<=K$) output from Gabor filters under the condition that parameter a takes different values, entropy correlation coefficient is employed.

Entropy correlation coefficient is a method for describing the matching similarity degree between two images by means of mutual information. For two images A and B with the same sizes, assuming their entropies are respectively H(A) and H(B), combinative entropy is H(A,B), mutual information is I(A, B)=H(A)+H(B)−H(A,B), the entropy correlation coefficient ECC is defined as:

$$ECC(A,B)=2*I(A,B)/(H(A)+H(B))$$

wherein, entropy H(A) and H(B) are respectively calculated by means of the brightness histogram of images A and B.

Assuming the distribution of the brightness histogram of image A is Hist(i), $0<=i<=255$ and the total number of the pixels in the image is PN, the entropy of image A is:

$$H(A) = -\sum_{i=0}^{255} \frac{Hist(i)}{PN} \log \frac{Hist(i)}{PN}$$

For image B, H(B) can be calculated in the same way.

For combinative entropy H(A,B), firstly it is needed to calculate the statistic of the combinative histogram distribution Hist2(i,j) of images A and B, wherein Hist2(i,j) is defined as, in the same position, the total number of the pixels whose brightness are i or j in the images A and B. After obtaining Hist2(i,j), the combinative H(A, B) of images A and B is calculated as follows:

$$H(A, B) = -\sum_{i=0}^{255} \sum_{j=0}^{255} \frac{Hist2(i, j)}{PN} \log \frac{Hist2(i, j)}{PN}$$

Upon the above, ECC is only dependent on the statistic of the brightness distribution of the pixels corresponding to two images, while ECC has no relationship with the specific difference of brightness. Therefore, a preferable capability to match images is obtained.

According to above-mentioned calculation of entropy correlation coefficient, a method for calculating the average entropy correlation coefficient of $\{[G_m(i, j)]_{M \times M}\}$ ($1<=m<=K$) is illustrated as follows.

The $\{[G_m(i, j)]_{M \times M}\}$ ($1<=m<=K$) resulting from processing character image $[A(i, j)]_{N \times N}$ by a Gabor filter group is firstly homogeneously quantified as $\{[G^*_m(i,j)]_{M \times M}\}$ ($1 \leq m \leq K$) taking the values of integer 0~255:

$$G^*_m(i,j) = \left\lfloor [G_m(i,j) - \text{MIN}_m] \frac{255}{(\text{MAX}_m - \text{MIN}_m)} + 0.5 \right\rfloor, \forall i, j, 1 \leq m \leq K$$

$$\text{MAX}_m = \max_{\forall i,j}(G_m(i,j)), \text{MIN}_m = \min_{\forall i,j}(G_m(i,j)),$$

wherein, $\lfloor \ \rfloor$ is for round-off.

Then, calculating the average entropy correlation coefficient $\overline{ECC}$ of matrixes $\{[[G^*_m(i,j)]_{M \times M}]\}$ ($1 \leq m \leq K$):

$$\overline{ECC(\sigma)} = \frac{2}{K(K-1)} \sum_{m1=1}^{K} \sum_{m2=1, m1>m2}^{K} ECC(G^*_{m1}, G^*_{m2})$$

Seen from above equation, average entropy correlation coefficient $\overline{ECC}$ is actually the average of the sum of similarity of each two matrixes among the matrixes $\{[G_m(i, j)]_{M \times M}\}$ ($1<=m<=K$) output from Gabor filter group after processing character image. If the similarity among the matrixes $\{[G_m(i, j)]_{M \times M}\}$ ($1<=m<=K$) is small, the $\overline{ECC}$ is small; otherwise, the $\overline{ECC}$ is large.

When the parameter σ of Gabor filter group takes different values within a predetermined range, after the Gabor filter group processes the same character image, different matrixes are obtained, then, calculating average entropy correlation coefficient $\overline{ECC}$s of the matrixes, output from Gabor filter group, corresponding to every value of σ, and selecting the smallest $\overline{ECC}$ which corresponds to the optimal value of σ. According to the optimal value of σ, suitable value of D is determined, thereby, achieving the objective of parameter optimization.

Figure 2:
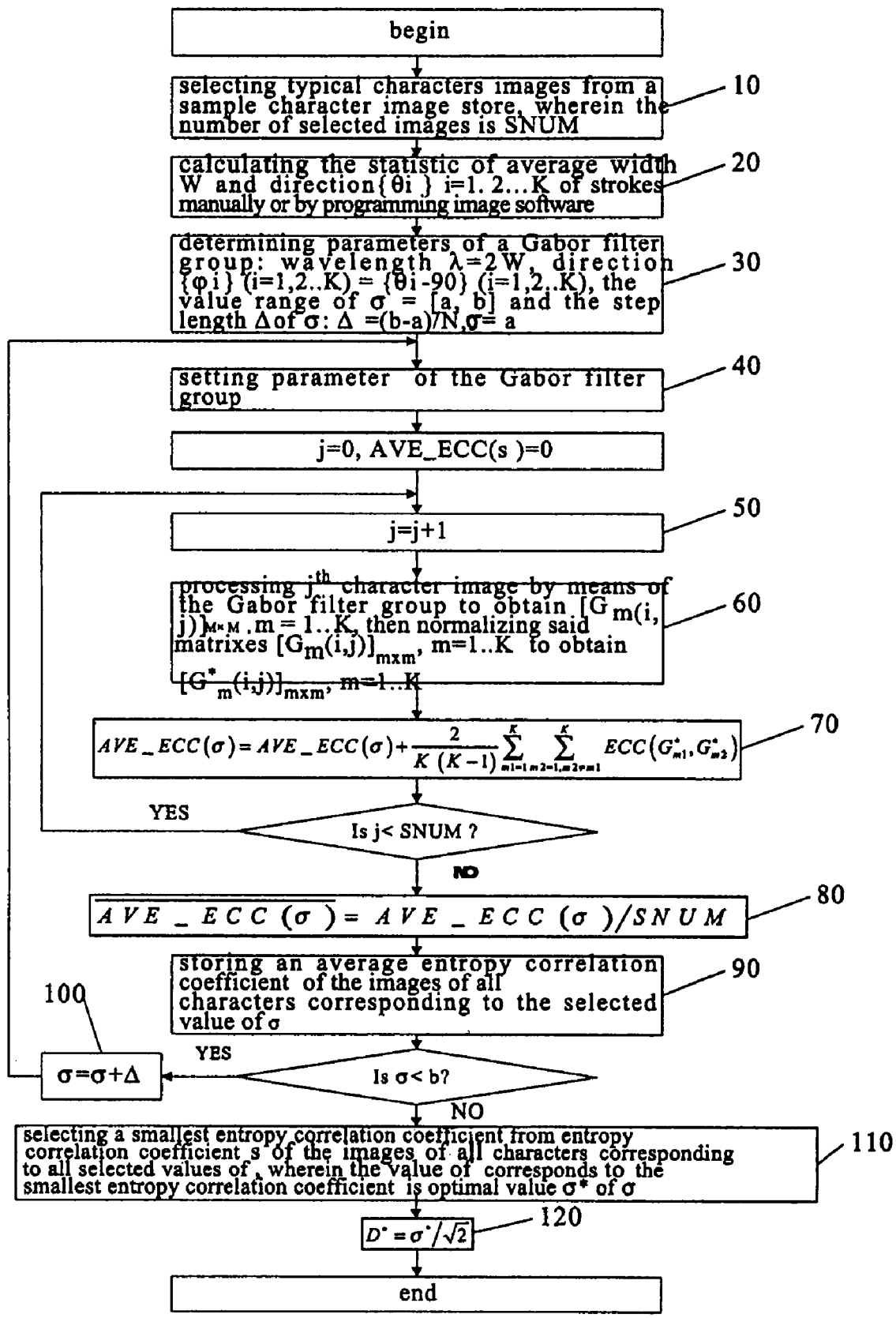
FIG. 2 is a flow chart of optimizing parameters of Gabor filter group.

For a deep understanding of the procedure of parameter optimization, reference is now made to the following descriptions taken in conjunction with FIG. 2.

Initiating

Characters' images, which are typical and whose total number is SNUM, are selected from training sample character image database (step 10), then pre-processing the selected images and obtaining the statistic of the average width and direction of the strokes (step 20); according to the statistic, determining initiating parametersλ,φi (i=1,2 . . . K) for the Gabor filter group, the value range [a, b] of σ and the step length Δ of σ:Δ=(b−a)/N, for every step length Δ within the range [a, b], determining a series values for $\sigma_i$(i=1,2, 3, . . . N+1) (step 30).

Calculating the average entropy correlation coefficient $\overline{ECC}$ corresponding to each of values of $\sigma_i$.

Firstly to set parameter σ of the Gabor filter group as $\sigma_1$, i.e., σ=a (step 40); then, employing the Gabor filter group to calculate, in sequence, the average entropy correlation coefficient $\overline{ECC}$ for each image of the total images, the number of which is SNUM, and accumulating the $\overline{ECC}$s (step 50, 60 and 70); finally, averaging the accumulated value of the $\overline{ECC}$s, thereby, obtaining the average entropy correlation coefficient $\overline{ECC}$ of all images corresponding to , $\sigma_1$ (step 80) then storing it (step 90). Accordingly, respectively calculating and storing the average entropy correlation coefficient $\overline{ECC}$ of all images corresponding to $\sigma_2$, to $\sigma_3$, . . . to $\sigma_{N+1}$(step 100).

Acquiring the optimal value of σ

The smallest average entropy correlation coefficient $\overline{ECC}$ is selected from the average entropy correlation coefficient $\overline{ECC}$s of all images respectively corresponding to $\sigma_2$, to $\sigma_3$, . . . to $\sigma_{N+1}$ and the smallest one is the optimal value of σ (σ*) (step 110), then calculating D*=σ*/√2 (step 120). Thus, optimization of parameters of Gabor filter group is realized.

Figure 4:
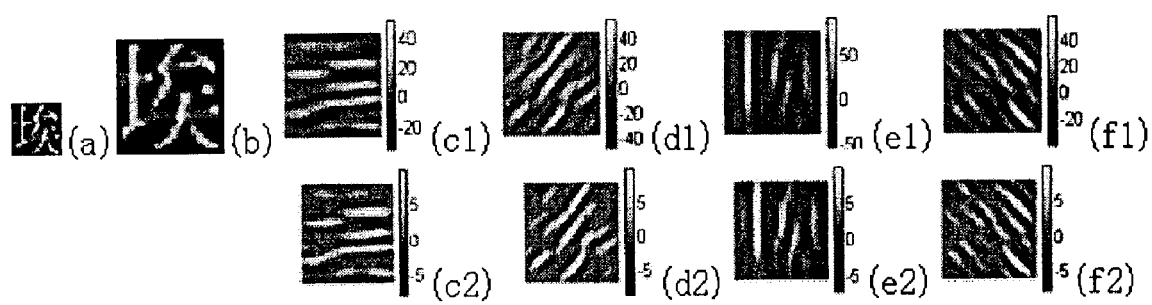
FIG. 4 is a diagram showing the result of the gray character image which is pre-processed, consecutively processed by Gabor filter group and finally adaptively processed, wherein, (a) is a diagram showing a character image with a low-resolution and a size of 20 pixel×20 pixel; (b) is a diagram showing the result of pre-processing; (c1)~(f1) are diagrams showing the output results after processed by Gabor filter group (the degrees of ϕ are respectively −90°, −45°, 0° and 45°), wherein white color represents positive values and black color represents negative values; (c2)~(f2) are respectively the diagrams showing the results of adaptively processing the images of (c1)~(f1).

In FIG. 4, (c1), (d1), (e1) and (f1) show the output of a Chinese character processed by the optimized Gabor filter group. Seen from FIG. 4, optimized Gabor filter group performs well in separating the strokes in different directions inside the character image.

III. Adaptively processing

Within the step, employing corrected Sigmoid function to non-linear adaptively process the K matrixes $[G_m(i, j)]_{M \times M}$, ($1<=m<=K$), obtained in the step of extracting stroke direction information of characters, each of said matrixes representing the stroke information of one direction, thereby, obtaining K matrixes $[F_m(i, j)]_{M \times M}$, ($1<=m<=K$), for the image of each character to be recognized.

For binary image, after processed by optimized Gabor filter group, recognition features can be directly extracted from obtained matrixes representing information of strokes in different direction. However, for gray character image under an adverse circumstance, recognition features cannot be directly extracted from the results after processed by optimized Gabor filter group, because the gray character images acquired under different illumination circumstances or during different taken courses have different brightness and contrast; even within a image, due to un-uniform illumination, the brightness of every stroke may vary. Even though Gabor filter has the capability to resist disturbance, after processed by Gabor filter group, the disturbance in the gray character image under the adverse circumstance has not been completely eliminated, because the disturbance line with low brightness, the disturbance lines with the width much less than that of stroke and the change in brightness with the width much-greater than that of stroke will generate output with a very small argument.

In order to restrain the influence of the change in brightness of image on the capability to recognize characters (abbreviated as invariability of brightness), it is necessary to further process the output from the Gabor filter group so as to restrain the output resulted from the disturbance.

Figure 5:
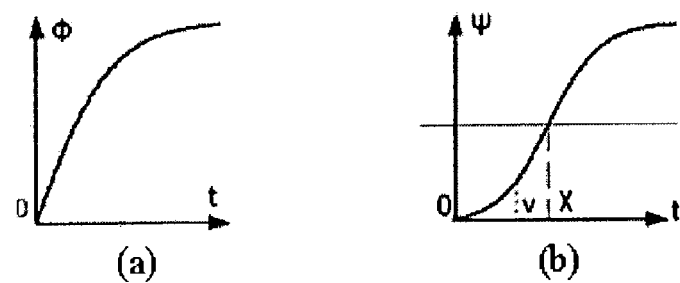
FIG. 5 is a diagram of Sigmoid function and corrected Sigmoid function, wherein, (a) is the diagram of Sigmoid function and (b) is the diagram of corrected Sigmoid function.

Therefore, in the invention, corrected Sigmoid function $\psi_m(t)$ ($1 \leq m \leq K$) is employed to respectively carry out non-linear adaptive process on each of $\{[G_m(i,j)]_{M \times M}\}$ ($1 \leq m \leq K$) output from the Gabor filter group in order to restrain the disturbance, wherein, function $\psi_m(t)$ ($1 \leq m \leq K$) is the translation result of the Sigmoid function $\phi(t)$, as shown in FIG. 5.

Sigmoid function $\phi(t)$ will saturate the large input, which can compensate the difference in brightness of each part of the image and the slight change in the width of strokes. After correction, corrected Sigmoid function $\psi_m(t)$ ($1 \leq m \leq K$) not only retain the saturation feature for large inputs, but also put up a restrain feature for weak inputs, thus, avoiding function $\phi(t)$'s amplifying action on weak input and achieving restrain on output of noises and backgrounds.

Sigmoid function $\phi(t)$ is:, $$\phi(t) = \tan h(\alpha t) = (e^{2\alpha t} - 1)/(e^{2\alpha t} + 1)$$

Corrected Sigmoid function $\psi_m(t)$ is:

$$\psi_m(t) = \tan h(\alpha_m(t - \chi_m)) + \beta_m, \ 1 \leq m \leq K$$

Differentiating the corrected Sigmoid function $\psi_m(t)$:

$$\left. \frac{d\psi_m}{dt} \right|_{t=v_m} = 1, \ v_m < \chi_m, \ \arg \psi_m(0) = 0, \ 1 \leq m \leq K$$

Upon the above, when $t < v_m$, the gradient of $\psi_m(t) < 1$, putting up a restrain feature on weak input; when $t > \chi_m + (\chi_m - v_m)$, the gradient of $\psi_m(t) < 1$, i.e., putting up a strong saturation feature on large input.

In order to employ function $\psi_m(t)$, the parameters $\chi_m$, $\alpha_m$ and $\beta_m$ inside the function need to be determined. In the invention, defining $\chi_m$, $\alpha_m$ as follows: $0.1 < \chi_m < 0.5$, $2 < \alpha_m < 10$, the specific value of $\chi_m$ and $\alpha_m$ will be selected dependent on different recognition capabilities. The value of $\beta_m$ is determined dependent on different qualifications.

Figure 6:
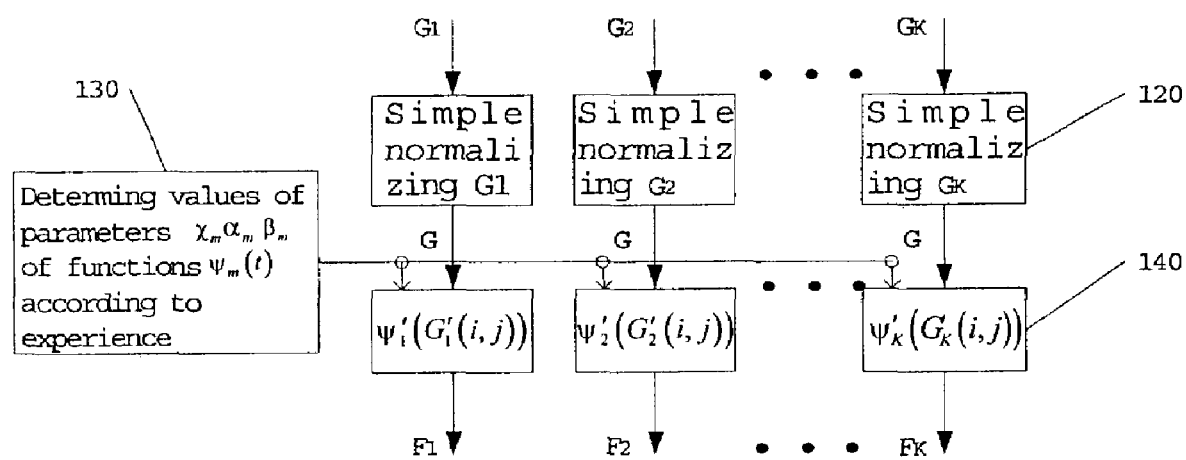
FIG. 6 is a flow chart of adaptively processing.

Reference is made in conjunction with FIG. 6 to describe how to employ corrected Sigmoid function $\psi_m(t)$ to non-linear adaptively process each of matrixes $[G_m(i, j)]_{M \times M}$, ($1<=m<=K$), output from Gabor filter group.

1. Normalizing matrixes (step 120)

Before each of the matrixes $\{[G_m(i,j)]_{M \times M}\}$ ($1<=m<=K$) output from Gabor filter group is non-linear adaptively processed, they shall be normalized in a simple way, thus, obtaining $\{[G'_m(i,j)]_{M \times M}\}$ ($1 \leq m \leq K$). The normalization is carried out based on following equation:

$$G'_m(i,j) = G_m(i,j)/MAX_m$$

wherein, $MAX_m = \max(|G_m(i,j)|)$

2. Determining Values of Parameters of Corrected Sigmoid Function $\psi_m(t)$ (step 130)

Within the range of $0.1 < \chi_m < 0.5$, $2 < \alpha_m < 10$, the values of $\chi_m$ and $\alpha_m$ are determined upon the requirements of recognition capability and experiences. The value of $\beta_m$ is determined upon experiences.

3. Adaptively processing by means of corrected Sigmoid function (step 140)

First to, turn the corrected Sigmoid function $\psi_m(t)$ with parameters determined to odd symmetry, thus, the corrected Sigmoid function $\psi_m(t)$ can also process the negative values in the matrixes $\{[G'_m(i,j)]_{M \times M}\}$ ($1 \leq m \leq K$), that is:

$$\psi'_m(t) = \begin{cases} \psi_m(t), & t \geq 0 \\ -\psi_m(-t), & t < 0 \end{cases},$$

Then to process $\{[G'_m(i,j)]_{M \times M}\}$ ($1 \leq m \leq K$), thus, obtaining output after processing, $F_m(i,j)]_{M \times M}$ ($1 \leq m \leq K$):

$$F_m(i, j) = \psi'_m(G'_m(i, j)) = \begin{cases} \tanh[\alpha_m(G'_m(i, j) - \chi_m)] + \beta_m, & G'_m(i, j) \geq 0 \\ -\tanh[\alpha_m(-G'_m(i, j) - \chi_m)] + \beta_m, & G'_m(i, j) < 0 \end{cases},$$

In this way, both the positive values and negative values in $\{[G_m(i,j)]_{M \times M}\}$ ($1 \leq m \leq K$) output from Gabor filter group are simultaneously processed, and achieved the result $\{[F_m(i,j)]_{M \times M}\}$ ($1 \leq m \leq K$).

IV. Extracting histogram features from blocks

Figure 7:
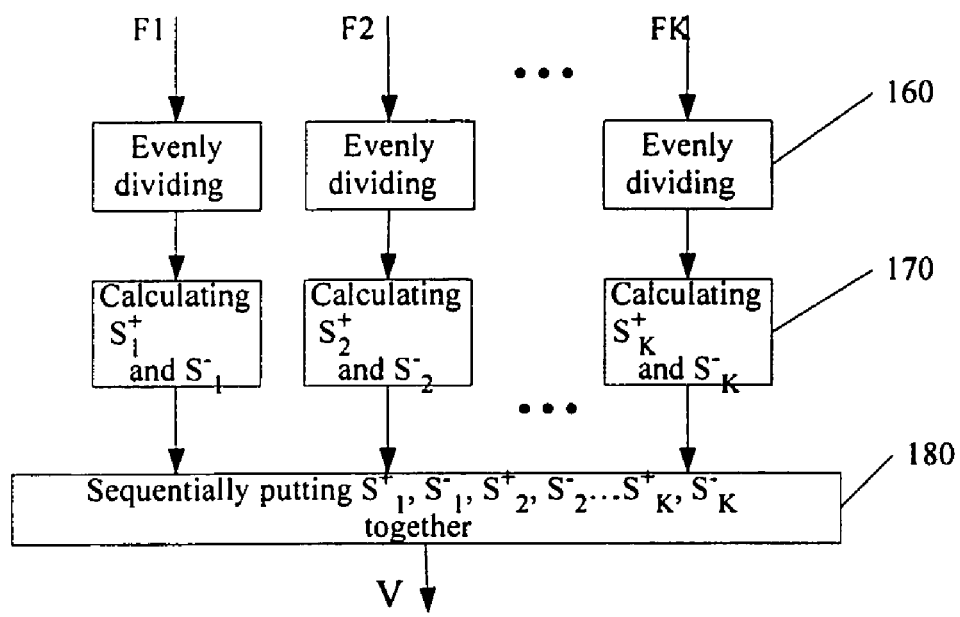
FIG. 7 is a flow chart of extracting histogram features from blocks.

Within the step, extracting histogram features from blocks of said K matrixes of the image of each character to be recognized, i.e., $[F_m(i, j)]_{M \times M}$, $m = 1 \ldots K$, obtained in the step of adaptively processing, thus, obtaining a initial recognition feature vector V with a high dimension for the image of each character to be recognized;

The following is detailed description of the procedure of extracting features from blocks in conjunction with FIG. 7.

1. Evenly dividing (step 160)

Figure 8:
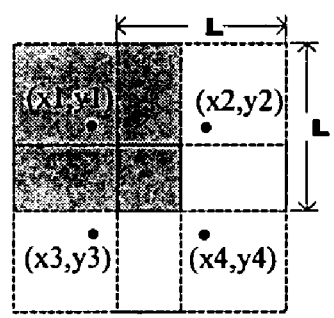
FIG. 8 is a diagram of dividing blocks when extracting histogram features from blocks.

For each of matrixes $\{[F_m(i,j)]_{M \times M}\}$ ($1 \leq m \leq K$), evenly dividing into P×P rectangular areas overlapped with each other and the length of side of each rectangular are L. FIG. 8 is a diagram showing the mode of dividing the rectangular into blocks.

2. Calculating Feature Vector $S_m^+$ and $S_m^-$ for each matrix (step 170)

At the center $r(x, y)$ of each rectangular area, respectively calculating the weighted sum of positive values and weighted sum of negative values for each area; then, based on the weighted sum of positive values and weighted sum of negative values of each rectangular area of each matrix, summing by Gaussian weighting, thereby, obtained the feature vector $S_m^+$ of positive values and the feature vector $S_m^-$ of negative values, wherein the dimensions of $S_m^+$ and $S_m^-$ are both $P^2$. The equations for calculating $S_m^+$ and $S_m^-$ are as follows:

$$S_m^+(x*P+y) = \sum_{(i,j)\in r(x,y)} G(i-x, j-y) \times \max(0, F_m(i,j))$$

$$S_m^-(x*P+y) = \sum_{(i,j)\in r(x,y)} G(i-x, j-y) \times \min(0, F_m(i,j))$$

wherein, $G(x,y)=\exp\{-(x^2+y^2)/2\}/(2\pi)$ is Gaussian weighting function.

3. Calculating initial recognition feature vector V (step 180)

The feature vector $S_m^+$ of positive values and the feature vector $S_m^-$ of negative values for each matrix are orderly merged as a feature vector, whose dimension is $2KP^2$, thus, obtaining initial recognition feature vector V:

$$V=[S_1^+ \ S_1^- \ S_2^+ \ S_2^- \ldots S_K^+ \ S_K^-].$$

V. Compressing features

With in the step, compressing the initial recognition feature vector V, thereby, obtaining a recognition feature vector $V_c$ with a lower dimension for the image of each character to be recognized.

The objective of the step is to further compress the initial recognition feature vector V so as to improve the distribution of features and after-mentioned capability of character recognition. Usually, compressing feature step carries out by means of LDA method.

The feature compression is realized by multiplying the initial recognition feature vector V by transformation matrix $\phi$. The dimension of the transformation matrix $\phi$ is $2KP^2 \times n$, wherein $n \leq 2KP^2$. The matrix $\phi$ is calculated by means of LDA method.

Figure 9:
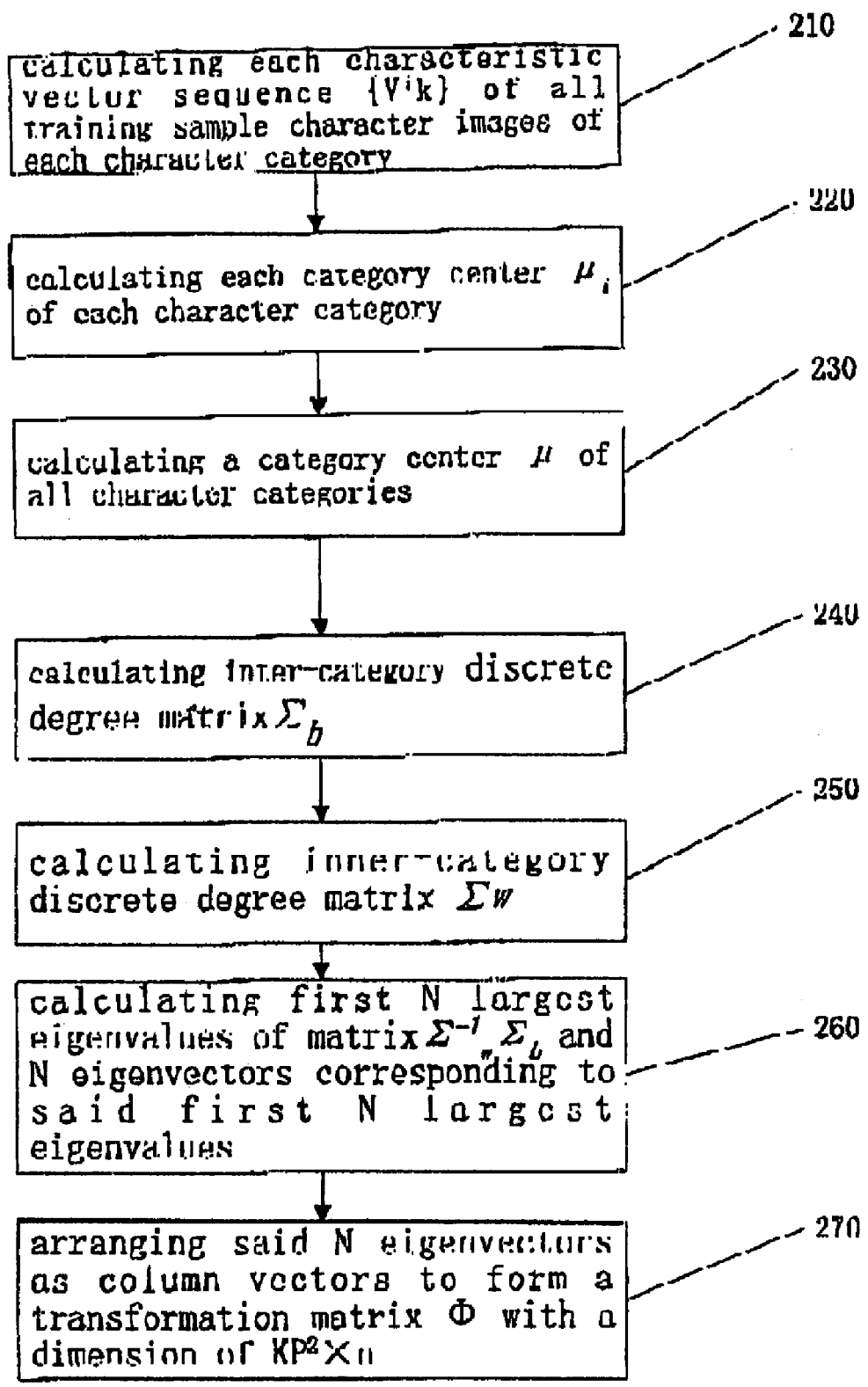
FIG. 9 is a flow chart of calculating a matrix of compressed features.

Following reference is made to describe the procedure of calculating transformation matrix $\phi$ in conjunction with FIG. 9.

1. Calculating feature vector sequence for each character category (step 210)

Assuming the total number of character categories is $C_o$, above-mentioned the steps of pre-processing, extracting information of strokes' direction of characters, adaptively processing and extracting from blocks are carries out for images of all training sample characters of each character category, thereby, obtaining feature vector sequence $\{V_i^1, V_i^2, \ldots V_i^{Qi}\}$ for each character category i, wherein, $Q_i$ the number of total images of training sample characters of character category i.

2. Calculating category center $\mu_i$ of each character category i and category center $\mu$ of all character categories According to feature vector sequence $\{V_i^1, V_i^2, \ldots V_i^{Qi}\}$ of each character category i, calculating category center $\mu_i$ of each character category i (step 220):

$$\mu_i = \frac{1}{Q_i}\sum_{k=1}^{Q_i} V_k^c$$

According to the category center $\mu_i$ of each character category i, calculating category center $\mu$ of all character categories (step 230):

$$\mu = \frac{1}{C}\sum_{i=1}^{c} \mu_i$$

3. Calculating between-class scatter matrix $\Sigma b$ and within-class scatter matrix $\Sigma w$ According to the category center $\mu_i$ of each character category i and the category center $\mu$ of all character categories, calculating inter-category discrete degree matrix $\Sigma b$ (step 240):

$$\sum_b = \sum_{i=1}^{c} \frac{1}{C}(\mu_i-\mu)(\mu_i-\mu)^T$$

According to the category center $\mu_i$ of each character category i, calculating inner-category discrete degree matrix $\Sigma_w$ (step 250):

$$\sum_w = \sum_{i=1}^{c} \frac{1}{C}\sum_{k=1}^{Q_i} \frac{1}{Q}[(V_k^i-\mu_i)(V_k^i-\mu_i)^T]$$

4. Calculating the transformation matrix $\phi$ used for feature compression.

The transformation matrix is found when the matrix maximize the value of $|\phi\tau\Sigma b\ \phi|/|\phi\tau\Sigma w\ \phi|$. By means of matrix calculating tool, first n largest non-zero eigenvalues of matrix $\Sigma^{-1}w\Sigma b$ are achieved, and first n eigenvectors corresponding to first n largest non-zero eigenvalues are arranged column by column to form the transformation matrix $\phi$ (step 260, 270).

After achieving the transformation matrix $\phi$, the compression on the initial recognition feature vector V can be carried out according to the following equation:

$$V_c = \phi^T V$$

Wherein: $V_C$ represents the compressed recognition feature vector.

The compressed recognition feature vector $V_C$ accords with the hypothesis of Gaussian distribution better in statistics, thus, the capability of classifiers improves and meanwhile, the complexity and the amount of calculation of classifiers are reduced.

Acquiring recognition feature vector $V_C$ means that the step of extracting features from the character image to be recognized is finished. The following step is to recognize by means of put the recognition feature vector $V_C$ into classifiers.

VI. Character recognition

In the step, the classifiers used are the statistical classifiers based on Bayes decision theory, for example, Gaussian distance classifiers.

During the procedure of character recognition, category center vector and its national standard code of each character category shall be acquired in advance.

Figure 10:
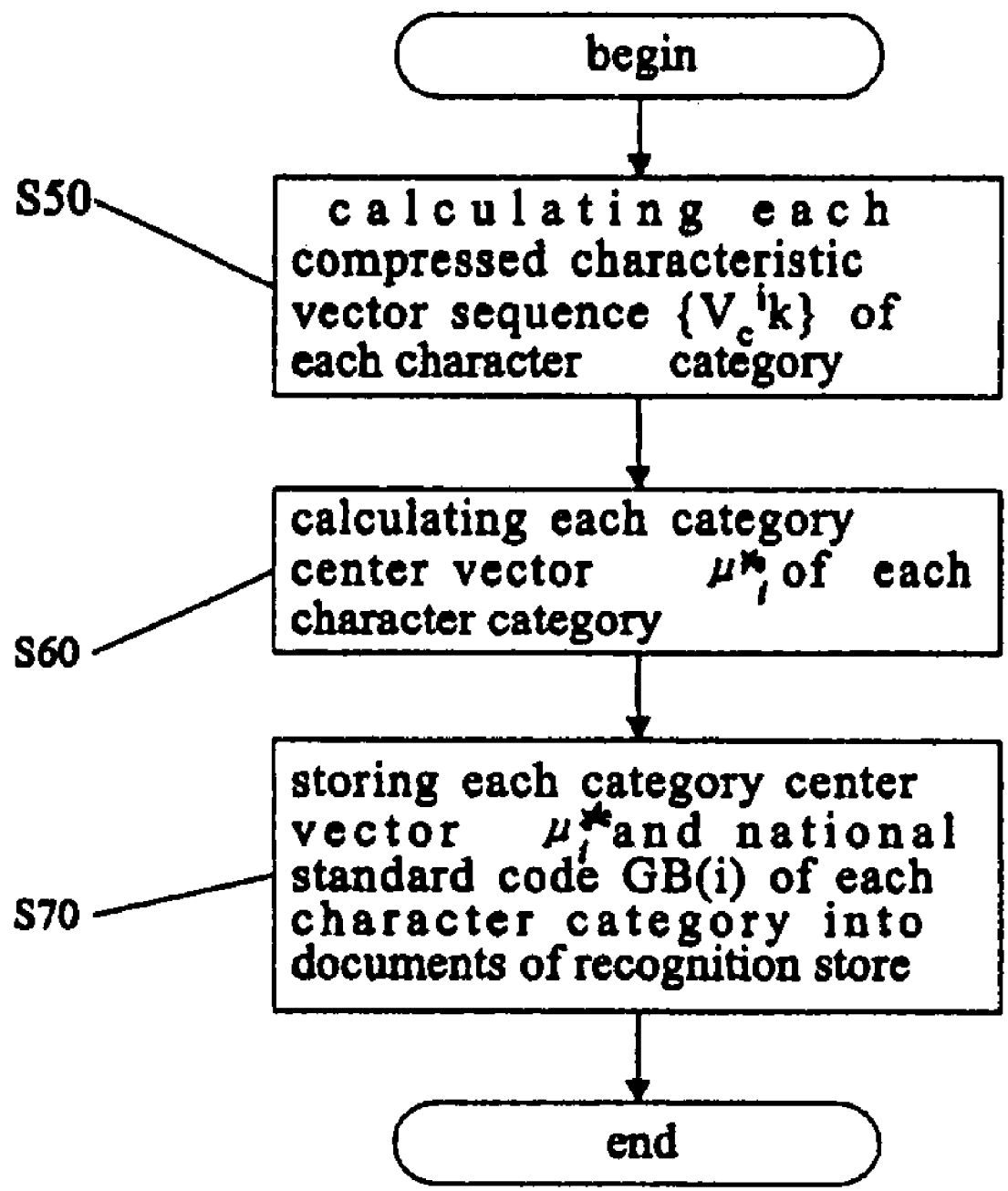
FIG. 10 is a flow chart of generating a recognition library.

Following reference is made to describe how to acquire category center vector and its national standard code of each character category in conjunction with FIG. 10.

1. Calculating Compressed Feature Vector Sequence of each Character Category

Assuming the total number of character categories is $C_o$, above-mentioned steps of pre-processing, extracting information of stroke's direction of characters, adaptively processing, extracting from blocks and compressing feature are carries out for images of all training sample characters of each character category, thereby, obtaining compressed feature vector sequence $\{V_{c1}{}^i, V_{c2}{}^i, \ldots V_{cQi}{}^i\}$ for each character category i (step S50), wherein, $Q_i$ is the number of total images of training sample characters of character category i.

2. Calculating category center of each character category

According to the compressed feature vector sequence $\{V_{c1}{}^i, V_{c2}{}^i, \ldots V_{cQi}{}^i\}$ for each character category i, calculating n-dimension category center $\mu_i^*$ of each character category i (step S60):

$$\mu_i^* = \frac{1}{Q_i} \sum_{k=1}^{Q_i} V_{c(k)}^i$$

3. Storing national standard code and category center vector of each character category According to a certain sequence, the national standard code GB(i) and n-dimension category center vector $\mu_i^*$ of each character category i are stored in the documents of recognition library (step S70).

Figure 11:
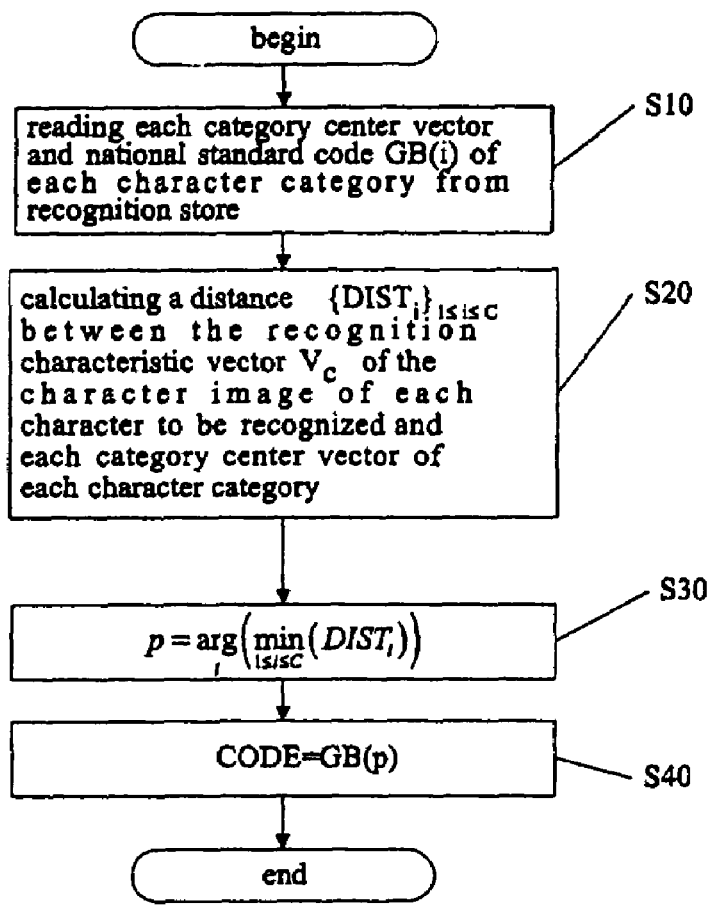
FIG. 11 is a flow chart of character recognition.

Reference is now made to describe the procedure of character recognition by means of Euclidean distance classifier in conjunction with FIG. 11.

1. Reading the national standard code and category center vector of each character category Category center vector $\{\mu_i^*\}_{1 \leq i \leq C}$ and national standard code GB(i) of each character category are read out from the recognition library (step S10).

2. Calculating the distance between the recognition feature vector $V_C$ and category center vector of each category The recognition feature vector $V_C$ of the character image to be recognized acquired in the step of compressing features is input, then the Euclidean distance $\{DIST_i\}_{1 \leq i \leq C}$ between the recognition vector $V_C$ and category center vector $\{\mu_i^*\}_{1 \leq i \leq C}$ is calculated as follows (step S20):

$$DIST_i = \frac{1}{n} \sum_{k=1}^{n} (V_c(k) - \mu_i^*(k))^2, \quad 1 \leq i \leq C.$$

3. Calculating the character code for each character to be recognized

According to the Euclidean distance $\{DIST_i\}_{1 \leq i \leq C}$ between the recognition vector $V_C$ and the category center vector of each character category, the smallest distance and the character category the smallest distance corresponds to are determined. According to the character category found out, the character code "CODE" of the image of each the character to be recognized is calculated (step S30, S40).

$$p = \arg\left(\min_{i}{}_{1 \leq i \leq C}(DIST_i)\right),$$

CODE=GB(p).

The code "CODE" is the recognition result of the character to be recognized, which can be output to the database of computers, the text files or directly displayed on the screen of computers.

Upon the above, the method for character recognition based on Gabor filter group can be divided into two states: training stage and character recognition stage.

During the course of the training: 1. According to the properties of image sample of characters, a method for extracting features is optimally designed, i.e., firstly, Gabor filter group is constructed and the parameters thereof are optimized; secondly, according to the requirements of recognition capabilities, the values of the parameters of corrected Sigmoid function $\psi_m(t)$ used in the step of adaptively processing are set; thirdly, the number of blocks each matrix is divided into in the step of extracting features from blocks is determined; the transformation matrix used in the step of compressing features is calculated; 2. Suitable classifier is selected; 3. Optimal method for extracting features is used, i.e., firstly, recognition features sequences of all character categories are obtained by extracting features from character's sample image of all character categories; secondly, all recognition features sequences are processed by selected classifier, and category center vectors of all character categories are obtained; finally, the category center vectors and the national standard codes of all character categories are stored in the recognition library.

During the course of recognizing characters, firstly, the character image is processed by means of the optimal method of extracting features obtained in the stage of training, and the recognition features vector is obtained; furthermore, the classifier calculates the distance between the recognition feature vector of the image of characters to be recognized and the category center vector of each category; moreover, according to the distances, the smallest distance and the character category which the smallest distance corresponds to are determined; finally, according to the national standard code of the character category found out, the character code "CODE" of the character image to be recognized is calculated.

Generally, the training stage of the present invention is carried out in the units developing the technique, while the character recognition stage is carried out at the user terminals.

The following description relates to an embodiment of a method for recognizing the images of Chinese characters based on Gabor filter group.

During the course of training:

1. Statistic of the width and direction of strokes

Figure 12:
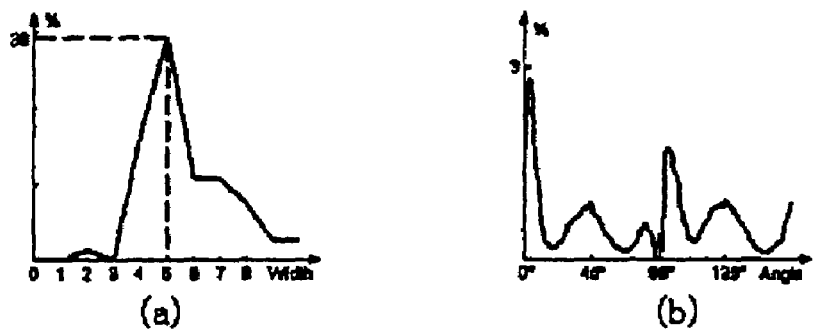
FIG. 12 is a diagram showing the statistic result of the width and direction of a Chinese character's strokes, wherein, (a) is the diagram showing the statistic result of the width of a Chinese character's strokes and (b) is the diagram showing the statistic result of the direction of a Chinese character's strokes.

A plurality of typical images of characters are selected from Chinese character training samples and these images are normalized as images of $[A(i,j)]_{N \times N}$ of 64×64 pixels and the statistic of the average width and direction of the strokes of these typical images is obtained. The statistic result is shown in FIG. 12. Seen from the statistic result, the average width of strokes W is 5 pixels and the direction of strokes distributes near four directions of $\{0°, 45°, 90°, 135°\}$.

2. Constructing Gabor filter group and optimizing the parameters

In the embodiment, the Gabor filter group comprises four Gabor filters, i.e., K=4. According to the statistic result of the average width and direction of the strokes, the parameters of the Gabor filter group are optimized, the optimized parameters are as follows:

$\lambda=10$, $\{\varphi_k\}_{k=1,2,3,4}=\{-90°,-45°,0°,45°\}$, $\sigma=5.6$, $D=4$.

3. Setting the parameters of corrected Sigmoid function $\psi_m(t)$

In the embodiment, all matrixes output from the Gabor filter group are processed by a same corrected Sigmoid function $\psi_m(t)$. According to the requirements of recognition capability, the setting are as follows: $\alpha=7, \chi=0.59, \beta=1.00$.

4. Determining the number of blocks divided in the step of extracting features from blocks In the embodiment, the number of blocks of each matrix is 8×8=64 and the length of side of each block is L=8. Thus, the initial recognition feature vector of the image of each character to be recognized is 512-dimension.

5. Determining the transformation matrix $\phi$ used in the step of compressing features In the embodiment, the 512-dimension initial recognition feature vector of the character image to be recognized can be compressed into 120-dimension recognition feature vector by the transformation matrix $\phi$ by means of LDA transformation.

6. Determining classifier

In the embodiment, Euclidean distance classifier is selected.

7. Generating a recognition library of chinese characters

The 3755 Chinese characters contained in the first class of national standard code are processed to obtain the category center vectors of 3755 Chinese characters, and the vectors and the national standard codes of these characters are stored in the documents of the recognition library.

During the course of recognizing characters:

1. Pre-processing

Firstly, the image of characters to be recognized is cut and the images of single characters are obtained; secondly, normalization process on each image of single character is carried out and the images $[A(i,j)]_{N \times N}$ obtained are all 64×64 pixels and in the images the color of the characters is white and that of background is black.

2. Extracting direction information of strokes

Each of the images $[A(i,j)]_{N \times N}$ of Chinese characters obtained in the step of pre-process is processed the Gabor filter group $\{\lambda_m, \phi_m, \sigma_{xm}, \sigma_{ym}, D\}$ ($1 \leq m \leq 4$)obtained during the course of training processes and the output in four directions $\{[G_m(i,j)]_{M \times M}\}$ ($1 \leq m \leq 4$) are obtained.

3. Non-linear processing

The output $\{[G_m(i,j)]_{M \times M}\}$($1 \leq m \leq 4$) of the image of each Chinese character to be recognized from the Gabor filter group is non-linear adaptively processed and matrix $\{[F_m(i,j)]_{M \times M}\}$ ($1 \leq m \leq 4$) of each Chinese character to be recognized is obtained.

4. Extracting histogram features from blocks

According to the flow chart shown in FIG. 7, the dividing mode shown in FIG. 8 and the number of blocks each matrix is divided into in the embodiment, for the positive values and negative values of matrixes $\{[F_m(i,j)]_{M \times M}\}$($1 \leq m \leq 4$) of the image of each Chinese character to be recognized, features of blocks are respectively calculated. And finally 512-dimension initial recognition feature vector of the image of each Chinese character to be recognized is obtained.

5. Compressing features

The 512-dimension initial recognition feature vector of the image of the Chinese character to be recognized can be compressed into 120-dimension recognition feature vector by the transformation matrix $\phi$, obtained during the course of training, by means of LDA transformation.

6. Recognizing Chinese characters

According to the 120-dimension recognition feature vector of the image of each Chinese character to be recognized, the Euclidean distance between the 120-dimension recognition feature vector of the image of each Chinese character and category center vector of categories which 3755 Chinese characters belong to is calculated by Euclidean distance classifier selected during the course of training. According to the distances obtained, the smallest Euclidean distance and the Chinese character the smallest Euclidean distance corresponds to are selected. Then according to the character's national standard code stored in the recognition library, the character code of the image of each Chinese character to be recognized is obtained.

FIG. 13 shows the comparison of recognition ratio between present embodiment and the best recognition method, at present, of extracting directional edge histogram features from the binary images when both of them recognize frequently seen print fonts of Chinese characters in different scanning resolutions. FIG. 14 shows the comparison of recognition ratio of these two methods used for recognizing the text images deteriorated by Gaussian noise $N(0, \sigma^2)$. Seen from FIG. 13 and FIG. 14, when recognizing high-guality images of print Chinese characters, the recognition capability of the embodiment is same as that of the best method; however, when recognizing low-quality images which are in low resolution and with disturbance, the recognition capability of the embodiment is far better than that of the best method at present.

FIG. 16 shows a system for character recognition based on the method for character recognition of the present invention. The system comprises two parts: image input device 300 and universal computer 310. The image input device 300 usually takes the form of scanner, digital camera, etc. to acquire the digital image of texts so as to facilitate the process by computers. Universal computer 310 is used to run the method for character recognition of present invention.

FIG. 17 shows a system for recognizing identification card based on the method of present invention, wherein the system comprises: photoelectric take-in device 400 (special digital camera), computer 410 (comprising the character recognition system and database). The photoelectric take-in device 400 is used to transform the identification card into digital image and input it into computer 410; computer 410 recognizes the input digital image invoking character recognition system, and the result is sent to database or compared with the data in the database to authenticate the identification card.

At a Custom Administration Office, images of 41 identification cards with different qualities are collected by means of the system of identification card. And the names and numbers on the cards are recognized. Seen from the result shown in FIG. 18, the whole recognition ratio of recognizing identification cards is up to 90%, which meets the practical demand.

ADVANTAGEOUS EFFECTS

In sum, seen from the comparison between an embodiment of the present invention and the best recognition method, at present, of extracting directional edge histogram features from the binary images, when recognizing high-quality images of print Chinese characters, the recognition capability of the method disclosed in present invention is same as that of the best method; when recognizing low-quality images which are in low resolution and with disturbance, the recognition capability of the invention is far better than that of the best method at present; when recognizing the images of handwritten characters, it can be seen that the method of the present invention possesses a strong resistance to the change in handwritten characters and obtains the highest recognition ratio at present,

What is claimed is:

1. A method for character recognition based on a Gabor filter group, said method comprising:
   (a) pre-processing a character image, said pre-processing including receiving, pre-processing the character image of a character to be recognized, and obtaining a binary or gray image with N×N pixels for each character to be recognized, wherein said binary or gray image for each character to be recognized is represented by a matrix $[A(i, j)]_{N \times N}$;
   (b) processing the matrix $[A(i, j)]_{N \times N}$ for the character image of each character to be recognized obtained in the step (a), said processing including:
      extracting stroke direction information of the character to be recognized, said extracting including employing the Gabor filter group which is composed of K two-dimension Gabor filters to extract stroke information in K different directions from the matrix $[A(i, j)]_{N \times N}$ of the character image of the character to be recognized, and obtaining K matrixes $[G_m(i, j)]_{M \times M}$, m=1 ... K, of the character image of the character to be recognized, wherein each of said matrixes $[G_m(i,j)]_{M \times M}$, m=1 ... K, possesses M×M pixels and represents the stroke information of one of the K directions;
      extracting features from blocks, including the steps of:
         (1) evenly dividing each of said K matrixes $[G_m(i, j)]_{M \times M}$ into P×P rectangular areas which are overlapped with each other and have a length L for each side of each rectangular are;
         (2) respectively calculating a first weighted sum of positive values and a second weighted sum of negative values of all pixels within the area, at the center of each rectangular area;
         (3) forming a first feature vector $S_m^+$ of positive values and a second feature vector $S_m^-$ of the negative values according to the first weighted sum and the second weighted sum of each rectangular area of each matrix, wherein the dimensions of $S_m^+$ and $S_m^-$ are both $P^2$; and
         (4) merging first feature vector $S_m^+$ and the second feature vector $S_m^-$ for each $[G_m(i, j)]_{M \times M}$ as an initial recognition feature vector $V=[S_1^+ \ S_1^- \ S_2^+ \ S_2^- \ ... \ S_K^+ \ S_K^-]$ with a dimension of $2KP^2$,
      compressing the features, including compressing the initial recognition feature vector V and obtaining a recognition feature vector $V_c$ with a low dimension of the character image of the character to be recognized;
      recognizing the character, including employing a specific classifier to calculate a distance between the recognition feature vector Vc and a category center vector of each character category, selecting a nearest distance from distances and the character category corresponding to the nearest distance, and calculating a character code of the character to be recognized according to a national standard code of the character category; and
   (c) repeating step (b) to obtain each character code of each character image.

2. The method of claim 1, wherein processing the matrix further includes a step of optimizing parameters, said optimizing parameters including:
   (1) selecting some typical character images from a training sample character image database, pre-processing the selected character images and obtaining a statistic of an average width and direction of the strokes of pre-processed images;
   (2) determining an initial value of each parameter in impulse response function of the Gabor filter group according to the statistic, and determining a plurality of values of a parameter a in impulse response function for every step length within a certain value range;
   (3) selecting one value from the plurality of values of σ, combining said value with other determined parameters to construct the Gabor filter group, extracting the direction information of strokes from the pre-processed image of the character by the constructed Gabor filter group, and calculating a first average entropy correlation coefficient $\overline{ECC}$ of the character image according to the information;
   (4) repeating step (3) to obtain each first average entropy correlation coefficient $\overline{Ecc}$ of the image of each character corresponding to selected value of σ, calculating an average value of all first average entropy correlation coefficients $\overline{ECC}$s of the image of each character to obtain a second average entropy correlation coefficient $\overline{EEC}$ corresponding to the selected value of σ;
   (5) repeating step (4) to obtain each second average entropy correlation coefficient $\overline{EEC}$ corresponding to each value of σ; and
   (6) selecting the smallest one from second average entropy correlation coefficients $\overline{ECC}$s, using the value of σ corresponding to the smallest second average entropy correlation coefficient $\overline{ECC}$ and other said determined parameters to optimally construct the Gabor filter group.

3. The method of claim 1, further comprising a step of adaptively processing, said adaptively processing including employing corrected Sigmoid function to adaptively process the K matrixes $[G_m(i, j)]_{M \times M}$, 1<=m<=K, wherein each of said matrixes represents the stroke information of one of the K directions to obtain K matrixes $[F_m(i, j)]_{M \times M}$, 1<=m<=K, for the character image of each character to be recognized wherein the step of extracting features from blocks operates on each of the K matrix $[G_m(i, j)]_{M \times M}$ or each of the K matrixes $[F_m(i, j)]_{M \times M}$.

4. The method of claim 2, further comprising a step of adaptively processing, said adaptively processing including employing corrected Sigmoid function to adaptively process the K matrixes $[G_m(i, j)]_{M \times M}$, 1<=m<=K, wherein each of said matrixes represents the stroke information of one of the K directions to obtain K matrixes $[F_m(i, j)]_{M \times M}$, 1<=m<=K, for the character image of each character to be recognized wherein the step of extracting features from blocks operates on each of the K matrixes $[G_m(i, j)]_{M \times M}$ or each of the K matrixes $[F_m(i, j)]_{M \times M}$.

5. The method of claim 3, wherein the step of adaptively processing further comprises:
   (1) normalizing said K matrixes $[G_m(i,j)]_{M \times M}$, 1<=m<=K, to obtain K matrixes $\{[G'_m(i,j)]_{M \times M}\}$, $1 \leq m \leq K$;
   (2) determining values of parameters of corrected Sigmoid function $\psi_m(t)$ according to the requirements of recognition capacity and experiences; and
   (3) non-linear adaptively processing said K matrixes $\{[G'_m(i,j)]_{M \times M}\}$, $1 \leq m \leq K$, using the determined corrected Sigmold function $\psi_m(t)$ to obtain K matrixes $[F_m(i,j)]_{M \times M}$ $1 \leq M \leq K$ wherein the step of extracting features from blocks operates on each of the K matrixes $[G_m(i, j)]_{M \times M}$ or each of the K matrixes $[F_m(i,j)]_{M \times M}$.

6. The method of claim 4, wherein the step of adaptively processing further comprises:
   (1) normalizing said K matrixes $[G_m(i,j)]_{M \times M}$, $1 <= m <= K$, to obtain K matrixes $\{[G'_m(i,j)]_{M \times M}\}$, $1 \leq m \leq K$;
   (2) determining values of parameters of corrected Sigmoid function $\psi_m(t)$ according to the requirements of recognition capacity and experiences; and
   (3) non-linear adaptively processing said K matrixes $\{[G'_m(i,j)]_{M \times M}\}$, $1 \leq m \leq K$, using the determined corrected Sigmoid function $\psi_m(t)$ to obtain K matrixes $[F_m(i,j)]_{M \times M}$, $1 \leq m \leq K$ wherein the step of extracting features from blocks operates on each of the matrixes $[G_m(i,j)]_{M \times M}$.

7. The method of any of claims 1–6, wherein said step of compressing features further includes:
   (1) calculating a transformation matrix $\phi$ used in the step of compressing features; and
   (2) transposing the transformation matrix $\phi$, multiplying the transposed transformation matrix $\phi$ by the initial recognition feature vector V of the character image of the character to be recognized thus compressing said initial recognition feature vector V and obtaining the recognition feature vector $V_c$ with a low dimension for the character image of the character to be recognized.

8. The method of claim 1, wherein said step of compressing features further includes:
   (1) calculating a transformation matrix $\phi$ used in the step of compressing features; and
   (2) transposing the transformation matrix $\phi$, multiplying the transposed transformation matrix $\phi$ by the initial recognition feature vector V of the character image of the character to be recognized thus compressing said initial recognition feature vector V and obtaining the recognition feature vector $V_c$ with a low dimension for the character image of the character to be recognized.

9. The method of claim 7, wherein said calculating a transformation matrix $\phi$ includes:
   (1) pre-processing the character image, extracting information of stroke's direction of the character, adaptively processing the images and extracting features from blocks regarding all training sample characters of each character category, and obtaining a recognition feature vector sequence for each character category;
   (2) calculating a first category center of each character category according to each recognition feature vector sequence of each character category;
   (3) calculating a second category center of all character categories, according to each first category center of each character category;
   (4) calculating a between-class scatter matrix $\Sigma b$ according to each first category center and the second category center;
   (5) calculating a within-class scatter matrix $\Sigma w$ according to each first category center; and
   (6) calculating first n largest, non-zero eigenvalues of matrix $\Sigma^{-1} w \Sigma b$, and arranging first eigenvectors corresponding to said first n largest non-zero eigenvalues column by column to form the transformation matrix $\phi$.

10. The method of claim 8, wherein said calculating a transformation matrix $\phi$ includes:
   (1) pre-processing the character image, extracting information of stroke's direction of the character, adaptively processing the images and extracting features from blocks regarding all training sample characters of each character category, and obtaining a recognition feature vector sequence for each character category;
   (2) calculating a first category center of each character category according to each recognition feature vector sequence of each character category;
   (3) calculating a second category center of all character categories, according to each first category center of each character category;
   (4) calculating a between-class scatter matrix $\Sigma b$ according to each first category center and the second category center;
   (5) calculating a within-class scatter matrix $\Sigma w$ according to each first category center; and
   (6) calculating first n largest, non-zero eigenvalues of matrix $\Sigma^{-1} w \Sigma b$, and arranging first n eigenvectors corresponding to said first n largest non-zero eigenvalues column by column to form the transformation matrix $\phi$.

* * * * *

UNITED STATES PATENT AND TRADEMARK OFFICE
CERTIFICATE OF CORRECTION

| | | |
|---|---|---|
| PATENT NO. | : 7,174,044 B2 | Page 1 of 1 |
| APPLICATION NO. | : 10/444315 | |
| DATED | : February 6, 2007 | |
| INVENTOR(S) | : Xiaoqing Ding et al. | |

It is certified that error appears in the above-identified patent and that said Letters Patent is hereby corrected as shown below:

On the Title page, under Item [30], Foreign Application Priority Data delete "02 1 17865" and insert --02117865.8--..

Signed and Sealed this

Eighth Day of May, 2007

JON W. DUDAS
*Director of the United States Patent and Trademark Office*